United States Patent [19]

Takano et al.

[11] Patent Number: 5,619,116

[45] Date of Patent: Apr. 8, 1997

[54] UNIVERSAL BATTERY CHARGER CHARGEABLE WITH RELEVANT CURRENT DEPENDENT ON CELL NUMBER

[75] Inventors: Nobuhiro Takano; Shigeru Shinohara; Mitsuo Ogura, all of Hitachinaka, Japan

[73] Assignee: Hitachi Koki Co., Ltd., Tokyo, Japan

[21] Appl. No.: 386,672

[22] Filed: Feb. 10, 1995

[30] Foreign Application Priority Data

Feb. 10, 1994 [JP] Japan ..................... 6-016370

[51] Int. Cl.$^6$ .................................................. H01M 10/44
[52] U.S. Cl. .................................................. 320/17; 320/39
[58] Field of Search .............................. 320/6, 8, 15, 17, 320/35, 39, 48

[56] References Cited

U.S. PATENT DOCUMENTS 1,445,025  2/1923  McFarland ....................... 320/6
5,113,128  5/1992  Ohara et al. ..................... 320/21

FOREIGN PATENT DOCUMENTS 157949   12/1982  Germany.
3815001  11/1989  Germany.
8-8749    1/1996  Japan.

*Primary Examiner*—Peter S. Wong
*Assistant Examiner*—E. Tso
*Attorney, Agent, or Firm*—Sughrue, Mion, Zinn, Macpeak & Seas

[57] ABSTRACT

To charge a battery having a different number of cells connected in series with a relevant charge current, the number of cells of the battery is firstly determined and a current level corresponding to the number of cells is determined in view of the potential of the charger. The charge current having a level substantially equal to the thus determined current level is flowed in the battery.

18 Claims, 4 Drawing Sheets

UNIVERSAL BATTERY CHARGER CHARGEABLE WITH RELEVANT CURRENT DEPENDENT ON CELL NUMBER

BACKGROUND OF THE INVENTION

1. Field of the Invention

The present invention relates to a battery charger for charging rechargeable batteries such as nickel-cadmium batteries (hereinafter referred to as "Ni-Cad batteries").

2. Description of the Related Art

Various battery chargers for charging rechargeable batteries have heretofore been proposed. Universal battery chargers are particularly widely used. Universal battery chargers are capable of charging various types of batteries formed from different numbers of serially connected cells. That is, a user can charge any type of battery, regardless of the number of cells it contains, in the same universal battery charger.

There is a great demand for hi-powered battery-operated power tools. High-voltage batteries formed from many cells have been produced to power these hi-powered tools. Because universal battery chargers should be able to charge all batteries with the same current, universal battery chargers are being produced large enough and with output capability that is high enough to also cope with charging high-voltage batteries.

Because universal battery chargers are provided with capacity of supplying power required for charging high-voltage batteries, that is, batteries with many cells, universal battery chargers are not used to their full potential when recharging batteries with few cells. For example, a universal battery charger capable of recharging a 20-cell Ni-Cad battery at 7 A can supply a maximum power of 184.8 W (i.e., 1.32 V electromotive force per cell×20 cells ×7 A=184.8 W). The same universal battery charger is theoretically capable of recharging a 10-cell Ni-Cad battery at 14 A (i.e., 184.8 W/1.32 V×10 cells=14 A). However, the relationship between the maximum current rates of components, such as diodes, high-frequency transformer, and FET, housed within the confined space of the universal battery charger, makes it so the same universal battery charger can actually recharge a 10-cell Ni-Cad battery with a charge current value of only about 10 A.

The size (volume) of the batteries increases with the number of cells forming the battery. As a result, the difference in temperature rise between different cells also increases. Therefore, when all batteries, regardless of the number of cells contained therein, are charged with the same current, cycle life of batteries tends to decrease by an amount that corresponds to the number of cells in the battery. That is, batteries with many cells will have a shorter cycle life than those with fewer cells.

SUMMARY OF THE INVENTION

It is an object of the present invention to eliminate the above-described problems, and to provide a universal battery charger that can be used to its full potential.

It is a further object to provide a universal battery charger that affects the cycle life of all batteries to the same degree regardless of the number of cells in the battery.

It is a still further object to provide a universal battery charger that can be produced in a more compact size than a conventional battery charger that charges with the same current regardless of the number of cells in the battery.

To achieve the above and other objects, there is provided a universal battery charger that is chargeable with a relevant charge current dependent on the number of cells in the battery. The battery has a number of cells connected in series. The battery charger includes cell number determining means for determining the number of cells of the battery. Current level determining means is provided for determining a current level corresponding to the number of cells determined by the cell number determining means. Charge current applying means applies a charge current to the battery so that the charge current has a level substantially equal to the current level determined by the current level determining means.

Battery voltage detecting means is further provided for detecting a voltage of the battery, and the cell number determining means determines the number of cells based on the voltage of the battery detected by the battery voltage detecting means. More specifically, the battery voltage detecting means includes preliminary charge instructing means for instructing the charge current applying means to apply a preliminary charge current to the battery for a predetermined period of time, and the battery voltage detecting means detects the voltage of the battery after the battery has been charged with the preliminary charge current for the predetermined period of time. Full charge detection means is provided for detecting a full charge condition of the battery and stopping the application of the charge current when the battery has reached the full charge condition.

Cell number classifying means is provided for classifying the number of cells determined by the cell number determining means to fall into one of a plurality of groups, and the current level determining means determines the current level corresponding to the group into which the number of cells determined by said cell number determining means falls. Preferably, the cell number classifying means classifies the number of cells determined by the cell number determining means to fall into one of two groups. The number of cells belongs to the one of two groups when the number of cells is greater than half maximum number of cells that can be charged with the battery charger and to another one of two groups when equal to or less than half the maximum number of cells. The charge current applying means applies a first charge current to the battery when the number of cells belongs to the one of two groups and a second charge current higher in level than the first charge current when the number of cells belongs to another one of two groups.

The cell number determining means may determine the number of cells in accordance with a position of a terminal of the battery.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
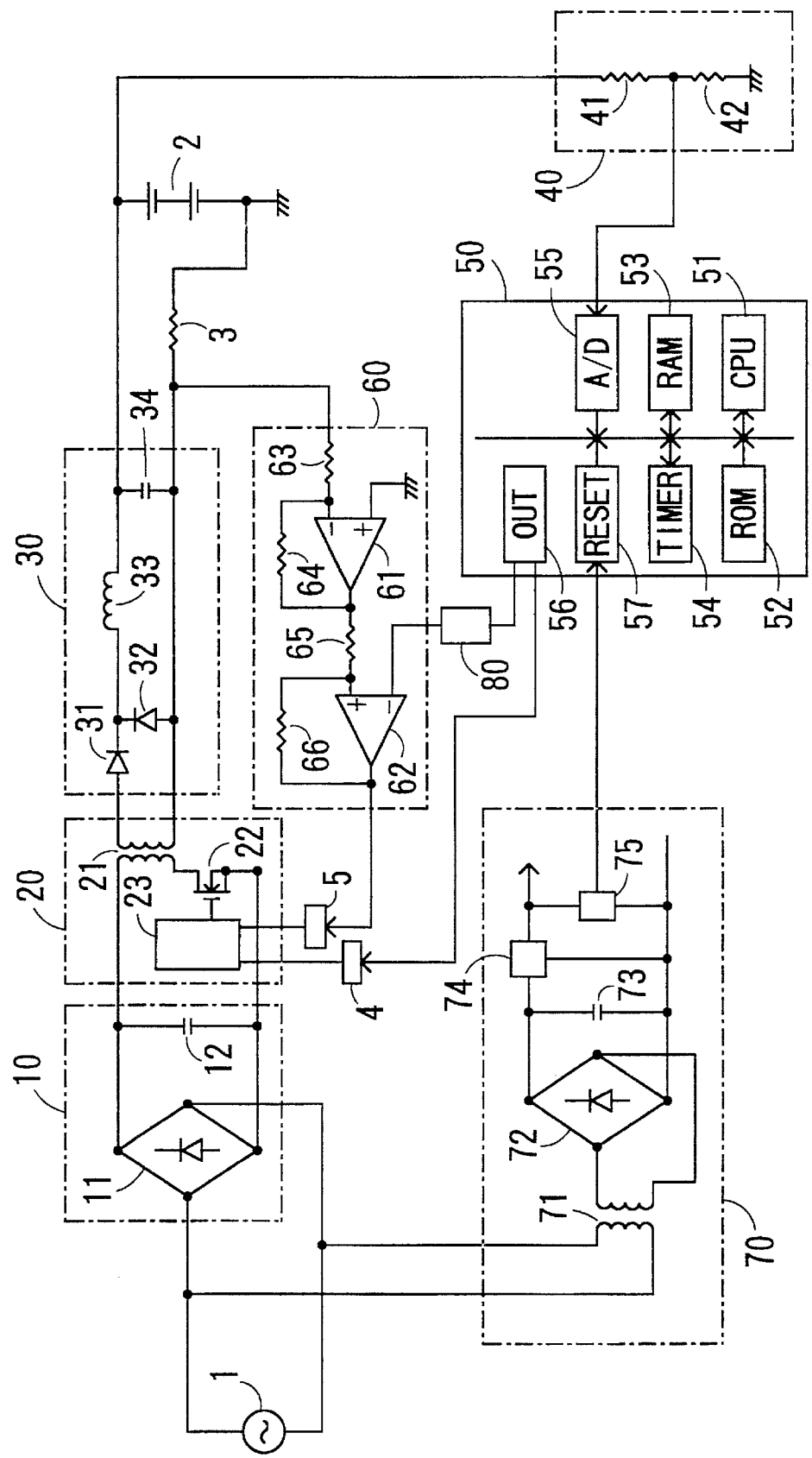
FIG. 1 is a circuit diagram showing interconnection of components of a battery charger according to a preferred embodiment of the present invention.

A battery charger according to a preferred embodiment of the present invention will be described while referring to the accompanying drawings wherein like parts and components are designated by the same reference numerals to avoid duplicating description.

To charge a rechargeable battery 2 with the battery charger shown in FIG. 1, the battery 2 is connected between a rectifying/smoothing circuit 30 (to be described later) and ground. The battery 2 consists of a plurality of cells connected in series.

The battery charger includes a resistor 3 serving as a current detection means for detecting a charging current flowing in the battery 2. A rectifying/smoothing circuit 10 is connected to an A.C. power source 1 for converting the A.C. voltage to D.C. voltage. The circuit 10 includes a full-wave rectifier 11 and a smoothing capacitor 12. A switching circuit 20 is connected to the output of the rectifying/smoothing circuit 10 and includes a high frequency transformer 21, a MOSFET 22, and a PWM (pulse width modulation) controlling IC 23. This IC 23 changes the width of driving pulses applied to the MOSFET 22. With the switching actions performed by the MOSFET 22, pulsating voltage is developed at the secondary side of the transformer 21. Another rectifying/smoothing circuit 30 is connected to the output of the switching circuit 20. The circuit 30 includes diodes 31, 32, a choke coil 33, and a smoothing capacitor 34. A battery voltage detection section 40 is connected in parallel to the battery 2 and is made up of two resistors 41 and 42 connected in series so that the voltage across the battery 2 is divided with a ratio of resistances of the two resistors. The output of the battery voltage detection section 40 is taken out from the junction of the resistors 41 and 42.

The battery charger further includes a microcomputer 50 having a CPU 51 (serving as a calculation means), a ROM 52, a RAM 53, a timer 54, an A/D converter 55, an output port 56, and a reset input port 57 which are mutually connected by a bus. A charging current applying section 60 is connected between the current detection section (resistor) 3 and the switching circuit 20 to maintain the charging current at a predetermined level. The charging current applying section 60 includes cascade-connected operational amplifiers 61 and 62, and resistors 63 through 66.

A constant voltage power supply 70 is provided for supplying constant voltages to the microcomputer 50 and the charging current applying section 60. The constant voltage power supply 70 includes a transformer 71, a full-wave rectifier 72, a smoothing capacitor 73, a three-terminal voltage regulator 74, and a reset IC 75. The reset IC 75 issues a reset signal to the reset input port 57 of the microcomputer 50 to reset the same. A charge current determining section 80 is connected between the output port 56 of the microcomputer 50 and the inverting input terminal of the cascade-connected operational amplifier 62. The charge current determining section 80 is for setting the charge current by changing the value of voltage applied to the inverting input terminal of the cascade-connected operational amplifier 62 in correspondence to the signal outputted by the microcomputer 50.

A photo-coupler 4 serving as a charge control signal relaying means is connected between the output port 56 of the microcomputer 50 and the IC 23 of the switching circuit 20. The photo-coupler 4 is for transmitting from the microcomputer 50 signals for controlling start and stop of charging. Another photo-coupler 5 serving as a charge current signal transmission means is connected between output of the cascade-connected operational amplifier 62 of the charge current applying means 60 and the PWM control IC 23. The photo-coupler 5 is for returning the charge current signal to the PWM control IC 23.

Figure 2:
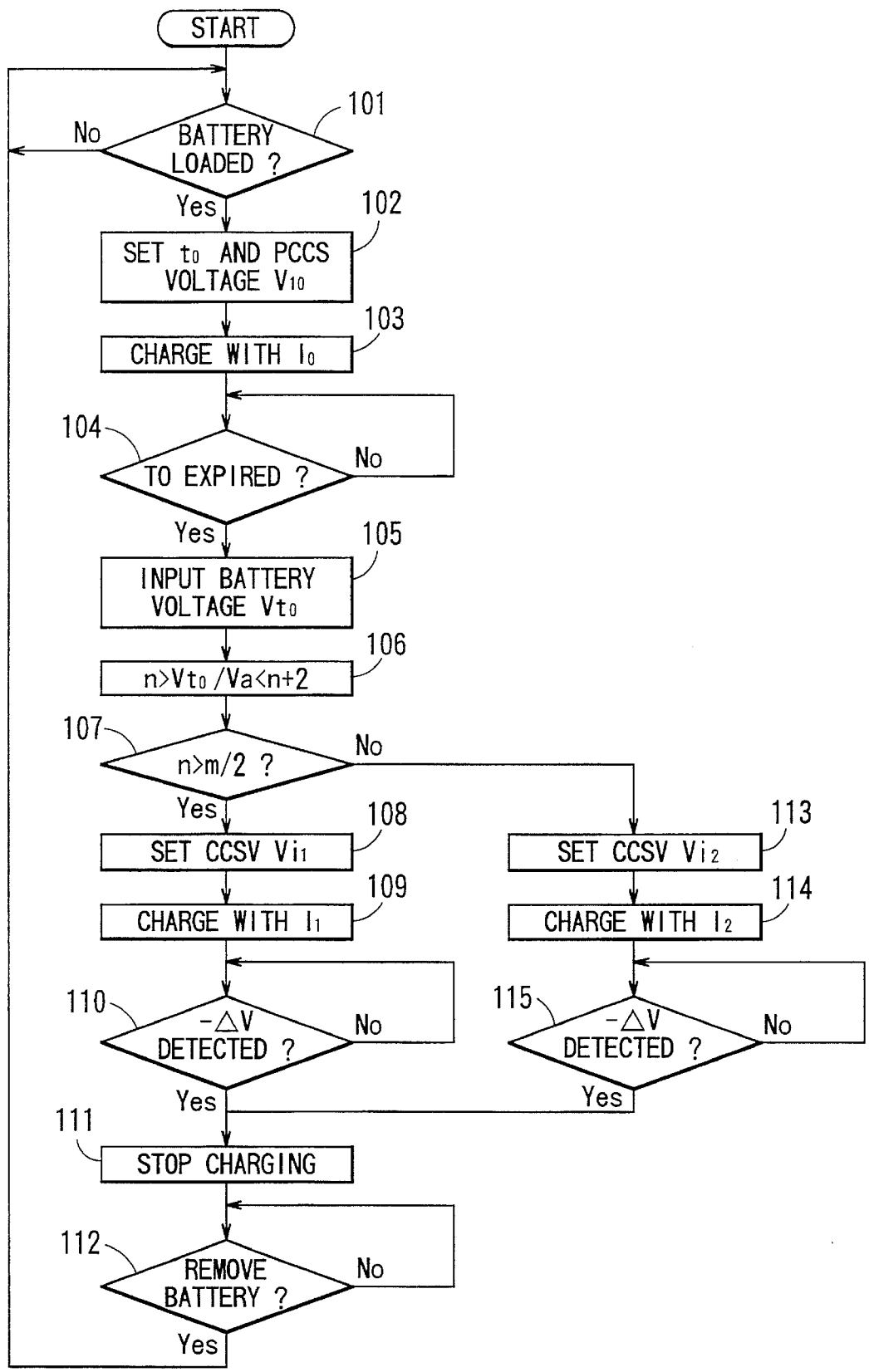
FIG. 2 is a flowchart showing a control program of the battery charger shown in FIG. 1.

Next, a description of operations of the battery charger will be provided while referring to the flowchart shown in FIG. 2. Hereinafter individual steps will be referred to with an "S" followed by the step number.

When power is turned ON, the microcomputer 50 goes into a standby condition until the battery 2 is determined to be loaded into the charger (S101). When, by referring to the signal outputted from the voltage detection section 40, the microcomputer 50 determines that the battery 2 is loaded or connected ("Yes" in S101), the microcomputer 50 sets the preliminary charge time $t_0$ and the preliminary charge current setting (PCCS) voltage $V_{10}$ for setting the preliminary charge current $I_0$ (S102). Then, in S103, the microcomputer 50 outputs a charge start signal from the output port 56 to the PWM control IC 23 via the charge control signal relaying section 4 and also outputs the PCCS voltage $V_{10}$ to the inverting input terminal of the operational amplifier 62 via the charge current determining section 80 to thereby start charging with the charging current $I_0$. When charging starts, the charge current applied to the battery 2 is detected at the resistor 3. The charging current applying section 60 determines the difference between the PCCS voltage $V_{10}$ and the voltage corresponding to the actual charge current and then feeds back the difference to the PWM control IC 23 via the photo-coupler 5.

More specifically, the width of the pulse applied to the high frequency transformer 21 is reduced when the actual charge current is too large and increased when the actual charge current is too small. The output from the secondary winding of the high frequency transformer 21 is subjected to rectification and smoothing by the rectifying/smoothing circuit 30. In this way, the charging current is maintained at a predetermined value $I_0$. That is, the resistor 3, the charging current applying section 60, the photo-coupler 5, the switching circuit 20, and the rectifying/smoothing circuit 30 operate together to control the charge current at the predetermined value $I_0$.

Next, the number of cells in the battery 2 is determined. Whether the preliminary charge time $t_0$ has expired since start of charge is checked in S104. The battery voltage $Vt_0$ after expiration of the preliminary charge time $t_0$ is obtained from the battery voltage detection section 40 and is inputted to the microcomputer 50 through the A/D converter 55 in S105. In S106, the number of cells "n" comprising the battery 2 is determined by successively comparing the battery voltage $Vt_0$ with each of standard voltages $nV_a$ which differ depending upon the number of cells in a battery, wherein n is the number of cells in the battery and $V_a$ is the standard voltage of each cell. Typically, $V_a$ is about 1.2 volts when charged with 1C. The voltage $V_a$ differs depending upon the level of the charge current. Note that this embodiment deals with batteries having even numbers of cells. That is, batteries have two more cells than the preceding smaller size battery.

In S107, it is determined whether the number of cells in the battery 2 is greater than half the maximum number of cells which can be charged with the battery charger. Specifically, the number of cells in the battery is compared with the value m/2 wherein m is the maximum number of cells that can be charged by the battery charger. If the battery 2 has more cells than half the maximum number m (i.e., S107 is YES), the program proceeds to S108 where a charge current setting voltage (CCSV) $V_{i1}$ is set which value $V_{i1}$ causes to produce the charge current $I_1$. In S109, the battery 2 is charged with the charge current $I_1$ wherein $I_1$ is greater than or equal to $I_0$. In S110, whether or not the battery 2 is fully charged is determined. Various methods are known in the art for detecting a fully charged condition of the battery. In this embodiment, a so-called $-\Delta V$ method is employed to detect the full charge of the battery. As the charging of the battery progresses, the battery voltage increases, reaches the peak voltage, and then goes down. According to the $-\Delta V$ method, it is determined that the battery is fully charged when after the battery voltage has reached the peak value, a predetermined voltage drop $-\Delta V$ occurred from the peak value. When the full charge is detected, the microcomputer 50 issues a charge stop signal to the PWM control IC 23 so that charging is stopped (S111). Whether or not the battery 2 has been removed from the charger is determined in S112. If so (i.e., S112 is YES), the program returns to S101, where loading of another battery is awaited.

When the battery 2 contains the same number or less cells than half the maximum number of cells m (i.e., S107 is NO), the CCSV $V_{i2}$ which value causes to produce the charge current $I_2$, is set in S113. Charging is continued after increasing the current supplied to the battery 2 to a charge current $I_2$ wherein charge current $I_2$ is greater than charge current $I_1$ and charge current $I_1$ is equal to or greater than the preliminary charge current $I_0$. Then whether the battery is fully charged or not is determined in S115 in the same manner as determined in S110. When full charge is detected, the microcomputer 50 issues a charge stop signal to the PWM control IC 23 so that charging is stopped (S111). Whether or not the battery 2 has been removed from the charger is determined in S112. If so (i.e., S112 is YES), the program returns to S101, where the program waits until another battery is loaded into the battery charger.

As described above, the number of cells in the battery to be charged is determined, whereupon the supply of the charge current is controlled so that the charge current is reduced when the battery has many cells whereas the charge current is increased when the battery has few cells. That is, the batteries with different number of cells can be charged with relevant charge current, so that undue temperature rise of particular cells which may occur due to overcharge can be prevented and the charge/discharge repetitions can be achieved a possible maximum number of times.

Figure 3:
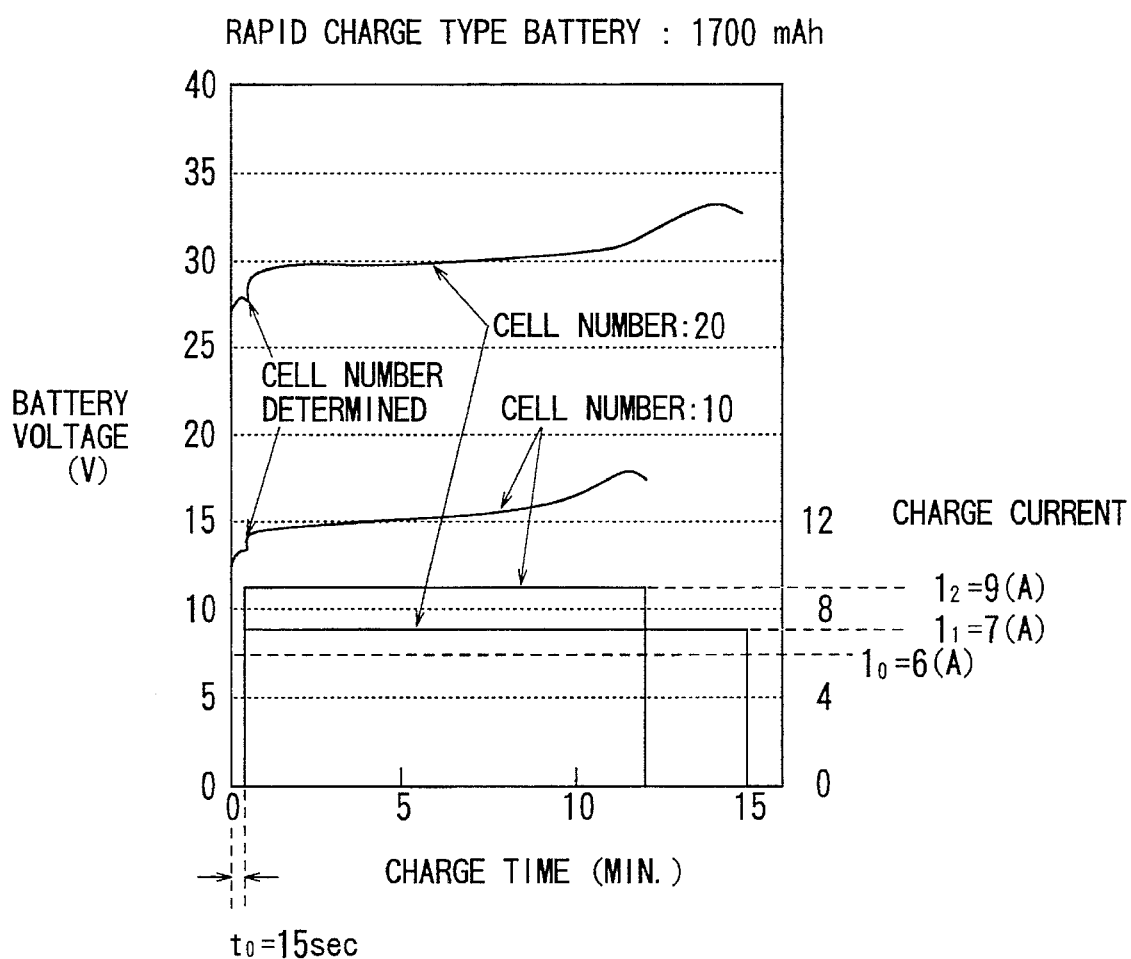
FIG. 3 is a chart comparing two charge characteristics shown by the battery charger when two different types of battery are charged therein.

The charging characteristics shown by the charger when charging batteries with 10 and 20 cells are indicated in FIG. 3. The initial or preliminary charge time $t_0$ is the duration of time required from the start of charging to when the number of cells comprising the battery can be determined by voltage of the battery.

In the present embodiment, charge current is set to one of only two possible values according to a single comparison step. That is, a low charge current is set if the number of cells comprising the battery is greater than half the maximum number of cells rechargeable by the battery charger or a high charge current is set if the number of cells is equal to or less than half the maximum number. However, the number of cells comprising the battery can be determined in further detail using further comparison detections. More specific charge currents can be predetermined for a greater variety of sizes and set according to the more accurate determined number. The battery charger can charge batteries with fewer cells more effectively in a shorter time.

Figure 4:
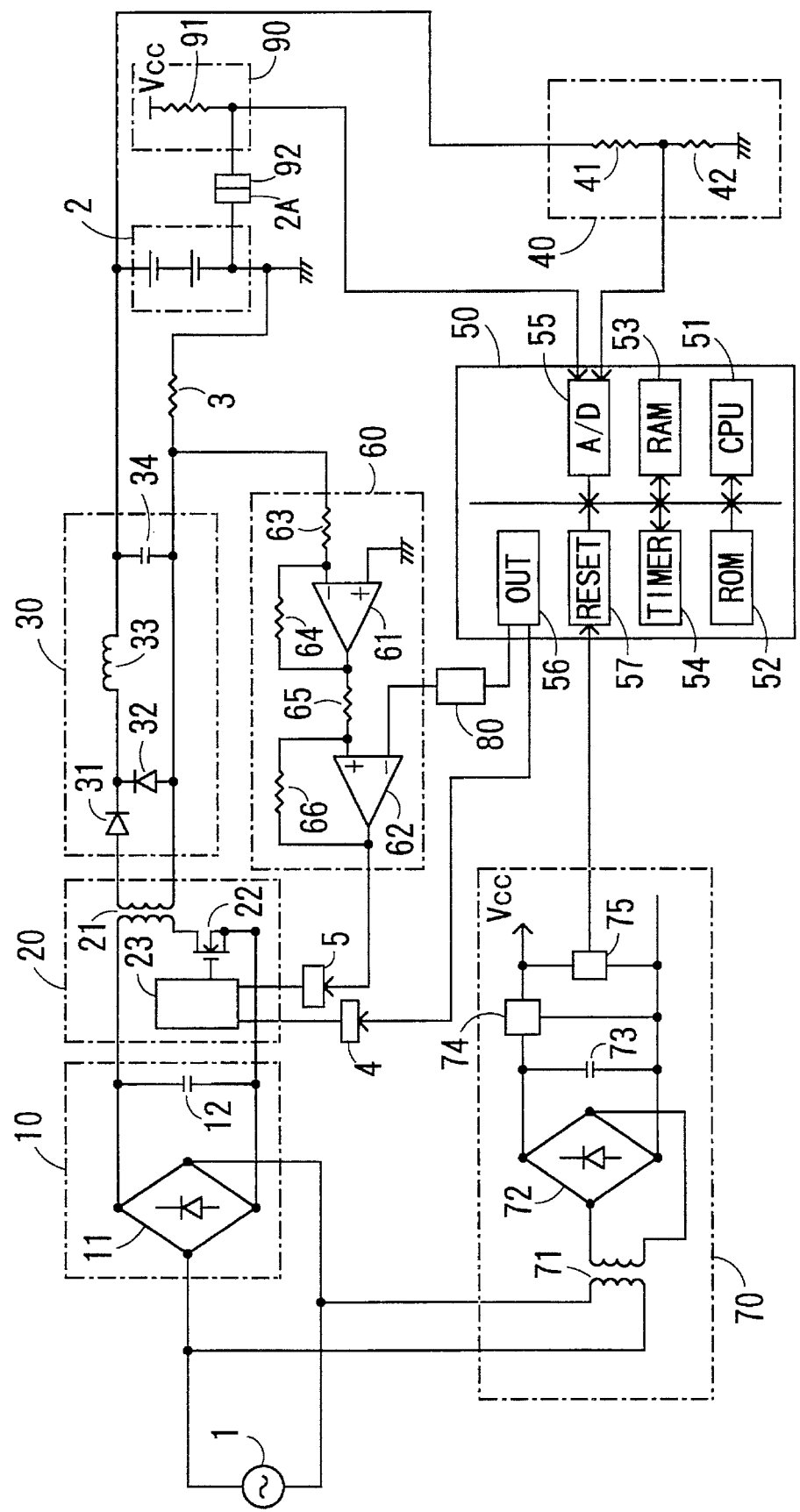
FIG. 4 is a circuit diagram showing interconnection of components of a battery charger according a modification of the preferred embodiment.

In the present embodiment, the battery charger is structured to determine the number of cells from the voltage outputted from the battery. However, other methods of determining the number of cells can be used. For example, as shown in FIG. 4, a cell number detection portion 90 may be separately provided. Each battery is provided with a terminal portion 2A that differs in position depending on the number of cells in the battery. Therefore, the position of the terminal portion 2A of the battery identifies the number of cells in the battery. The cell number detection portion 90 includes a resistor 91 and a terminal 92. The terminal 92 includes a predetermined number of contacts equal to the number of battery types that can be charged in the battery charger. The contacts are individually connected to the input port 55 of the microcomputer 50, and one of the lines led to the input port 55 is enabled when the corresponding contact is connected to the terminal portion 2A of the battery. With such an arrangement, when the terminal portion 2A is connected to the terminal 92 of the cell number detection portion 90, the number of cells is automatically inputted to the input port 55 of the microcomputer 50 so that accurate determination of the number of cells becomes possible.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. A battery charger for charging a battery having a number of cells connected in series, comprising:

cell number determining means for determining the number of cells of the battery;

current level determining means for determining a current level based on the number of cells determined by said cell number determining means, the current level determined when the number of cells of the battery is greater than a reference number being lower than the current level determined when the number of cells of the battery is smaller than the reference number; and charge current applying means for applying a charge current to the battery, the charge current having a level substantially equal to the current level determined by said current level determining means.

2. A battery charger according to claim 1, further comprising battery voltage detecting means for detecting a voltage of the battery, and wherein said cell number determining means determines the number of cells based on the voltage of the battery detected by said battery voltage detecting means.

3. A battery charger according to claim 2, wherein said battery voltage detecting means includes preliminary charge instructing means for instructing said charge current applying means to apply a preliminary charge current to the battery for a predetermined period of time, said battery voltage detecting means detecting the voltage of the battery after the battery has been charged with the preliminary charge current for the predetermined period of time.

4. A battery charger according to claim 3, further comprising full charge detection means for detecting a full charge condition of the battery and stopping the application of the charge current when the battery has reached the full charge condition.

5. A battery charger according to claim 1, further comprising cell number classifying means for classifying the number of cells determined by said cell number determining means to fall into one of a plurality of groups, and wherein said current level determining means determines the current level corresponding to the group into which the number of cells determined by said cell number determining means falls.

6. A battery charger according to claim 5, further comprising battery voltage detecting means for detecting a voltage of the battery, and wherein said cell number determining means determines the number of cells based on the voltage of the battery detected by said battery voltage detecting means.

7. A battery charger according to claim 6, wherein said battery voltage detecting means includes preliminary charge instructing means for instructing said charge current applying means to apply a preliminary charge current to the battery for a predetermined period of time, said battery voltage detecting means detecting the voltage of the battery after the battery has been charged with the preliminary charge current for the predetermined period of time.

8. A battery charger according to claim 7, wherein said cell number classifying means classifies the number of cells determined by said cell number determining means to fall into one of two groups.

9. A battery charger according to claim 8, wherein the number of cells belongs to the one of two groups when the number of cells is greater than half maximum number of cells that can be charged with the battery charger and to another one of two groups when equal to or less than half the maximum number of cells.

10. A battery charger according to claim 9, wherein said charge current applying means applies a first charge current to the battery when the number of cells belongs to the one of two groups and a second charge current higher in level than the first charge current when the number of cells belongs to another one of two groups.

11. A battery charger according to claim 10, further comprising full charge detection means for detecting a full charge condition of the battery and stopping the application of the charge current when the battery has reached the full charge condition.

12. A battery charger according to claim 1, wherein said cell number determining means determines the number of cells in accordance with a position of a terminal of the battery.

13. A universal battery charger for charging batteries having chargeable battery voltages specific to respective ones of the batteries, comprising:

battery voltage detecting means for detecting a voltage of the battery;

current level determining means for determining a current level based on the voltage of the battery detected by said battery voltage detecting means, the current level determined when the voltage of the battery is greater than a reference level being lower than the current level determined when the voltage of the battery is smaller than the reference level; and charge current applying means for applying a charge current to the battery, the charge current having a level substantially equal to the current level determined by said current level determining means.

14. A universal battery charger according to claim 13, wherein said battery voltage detecting means includes preliminary charge instructing means for instructing said charge current applying means to apply a preliminary charge current to the battery for a predetermined period of time, said battery voltage detecting means detecting the voltage of the battery after the battery has been charged with the preliminary charge current for the predetermined period of time.

15. A universal battery charger according to claim 14, further comprising full charge detection means for detecting a full charge condition of the battery and stopping the application of the charge current when the battery has reached the full charge condition.

16. A method of charging a battery with a universal battery charger, comprising the steps of:

(a) connecting a battery to be charged to said universal battery charger;

(b) detecting a voltage of the battery connected to said universal battery charger;

(c) determining whether the voltage of the battery detected in step (b) is greater than a reference voltage or lower than the reference voltage;

(d) setting a charge current to selective one of a first level when the voltage of the battery determined in step (c) is greater than the reference voltage and a second level when the voltage of the battery determined in step (c) is smaller than the reference voltage wherein the first level is smaller than the second level; and (e) charging the battery connected to said universal battery with the charge current determined in step (d).

17. A method according to claim 16, wherein step (b) comprises the steps of:

(b1) applying a preliminary charge current to the battery for a predetermined period of time; and (b2) detecting the voltage of the battery after the battery has been charged with the preliminary charge current for the predetermined period of time.

18. A method according to claim 17, further comprising the step of detecting a full charge condition of the battery and stopping the application of the charge current when the battery has reached the fully charge condition.

* * * * *